(12) United States Patent
Cho et al.

(10) Patent No.: US 9,998,584 B2
(45) Date of Patent: Jun. 12, 2018

(54) DISPLAY DEVICE AND METHOD OF CONTROLLING THE SAME

(71) Applicant: LG ELECTRONICS INC., Seoul (KR)

(72) Inventors: Eunhyung Cho, Seoul (KR); Doyoung Lee, Seoul (KR); Sinae Chun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 219 days.

(21) Appl. No.: 15/037,984

(22) PCT Filed: Jan. 21, 2014

(86) PCT No.: PCT/KR2014/000592
§ 371 (c)(1),
(2) Date: May 19, 2016

(87) PCT Pub. No.: WO2015/083890
PCT Pub. Date: Jun. 11, 2015

(65) Prior Publication Data
US 2016/0301795 A1 Oct. 13, 2016

(30) Foreign Application Priority Data

Dec. 5, 2013 (KR) .................. 10-2013-0150390

(51) Int. Cl.
*G06F 3/048* (2013.01)
*H04M 1/725* (2006.01)
(Continued)

(52) U.S. Cl.
CPC ........ *H04M 1/72552* (2013.01); *G06F 3/048* (2013.01); *G06F 3/0481* (2013.01);
(Continued)

(58) Field of Classification Search
CPC ....................................................... G06F 3/048
(Continued)

(56) References Cited

U.S. PATENT DOCUMENTS 8,175,656 B2 5/2012 Beith
2009/0061832 A1 3/2009 Goggans et al.
(Continued)

OTHER PUBLICATIONS

International Search Report and Written Opinion dated Sep. 3, 2014 issued in Application No. PCT/KR2014/000592 (Full English Text).

*Primary Examiner* — Peiyong Weng
(74) *Attorney, Agent, or Firm* — Ked & Associates, LLP

(57) ABSTRACT

A display device and a method of controlling the same are disclosed. The display device includes a sensor unit configured to detect a first gesture input for a control interface, a communication unit configured to transmit a signal for generating a first image to a mobile device based on the detected first gesture input and to receive a signal for generating a second image from the mobile device, a display unit configured to display the control interface and the second image, and a processor configured to control the sensor unit, the communication unit and the display unit and execute according to a received control signal. The mobile device generates the signal for generating the first image, displays the first image, detects second gesture input for the first image, and transmits the signal for generating the second image to the display device based on the detected second gesture input.

20 Claims, 10 Drawing Sheets

(51) Int. Cl.
*G06F 3/14* (2006.01)
*G06F 13/14* (2006.01)
*G06F 13/38* (2006.01)
*G06F 3/0481* (2013.01)
*G06F 3/0484* (2013.01)
*G06F 3/0488* (2013.01)

(52) U.S. Cl.
CPC ...... *G06F 3/04845* (2013.01); *G06F 3/04883* (2013.01); *G06F 3/14* (2013.01); *G06F 13/14* (2013.01); *G06F 13/38* (2013.01); *G06F 13/385* (2013.01); *G06F 2203/04806* (2013.01); *G06F 2203/04808* (2013.01); *H04M 2250/22* (2013.01)

(58) Field of Classification Search
IPC ...................................................... G06F 3/048
See application file for complete search history.

(56) References Cited

U.S. PATENT DOCUMENTS

| | | |
|---|---|---|
| 2010/0251119 A1 | 9/2010 | Geppert et al. |
| 2010/0262928 A1 | 10/2010 | Abbott |
| 2012/0322508 A1 | 12/2012 | Forstall et al. |

[Fig. 1]
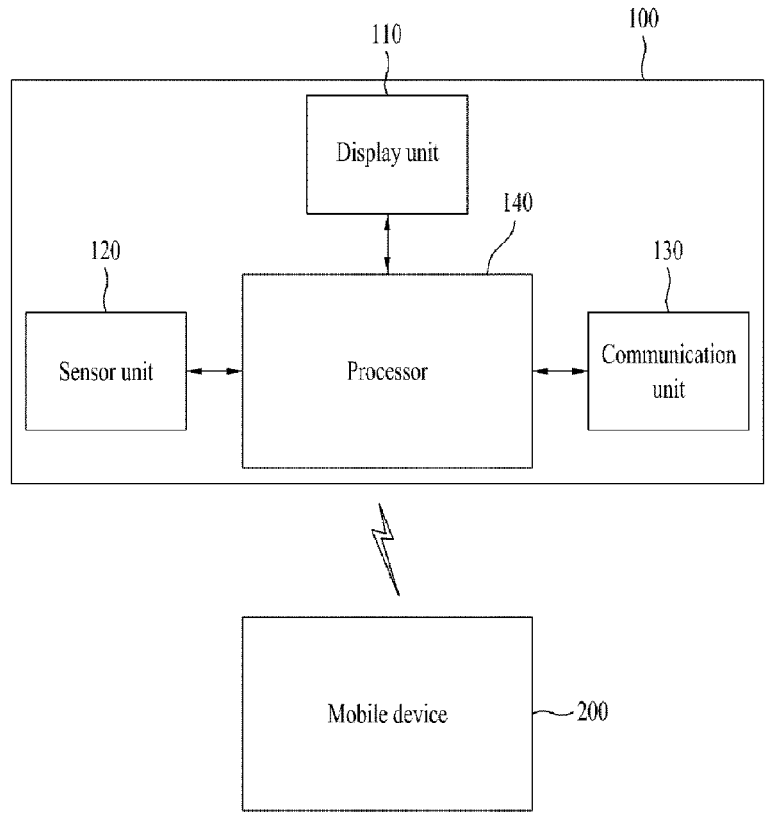
[Fig. 2]
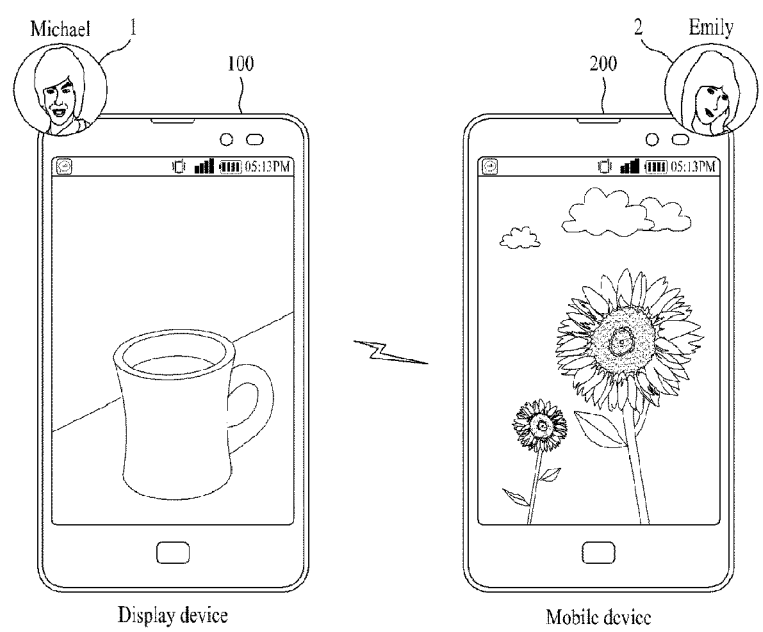

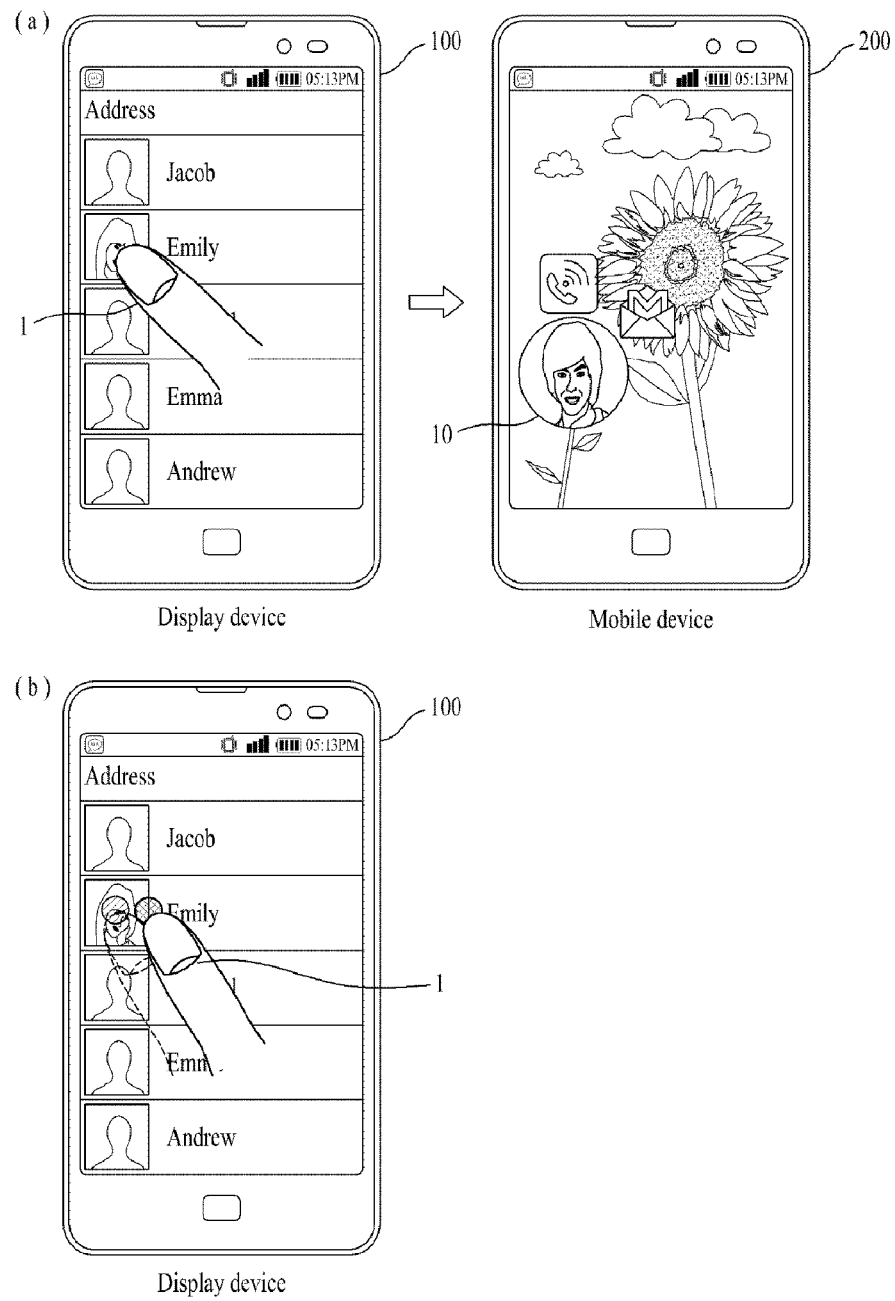

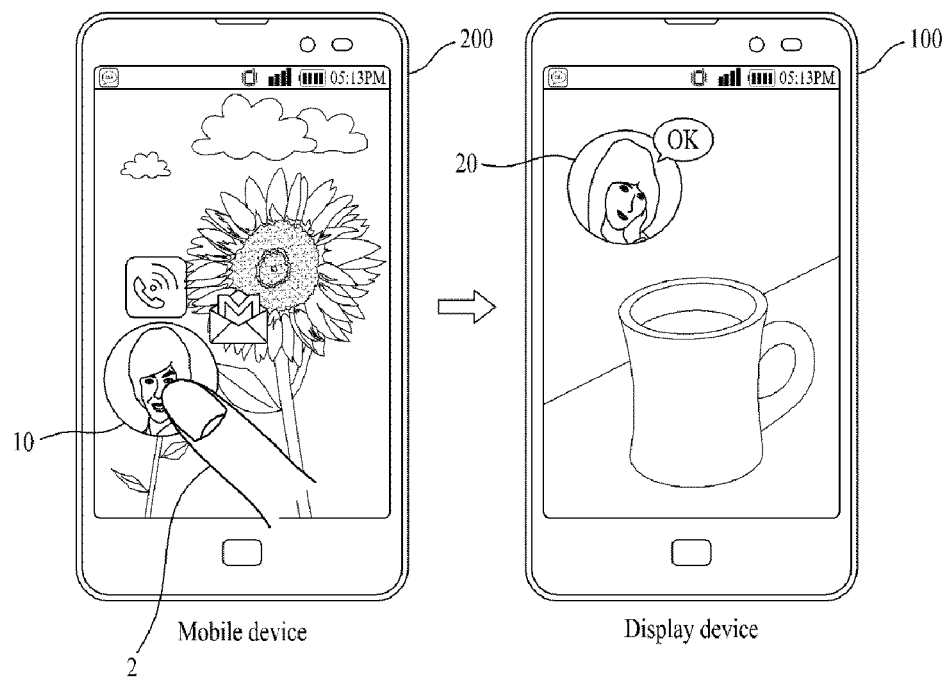
[Fig. 4a]

[Fig. 4b]
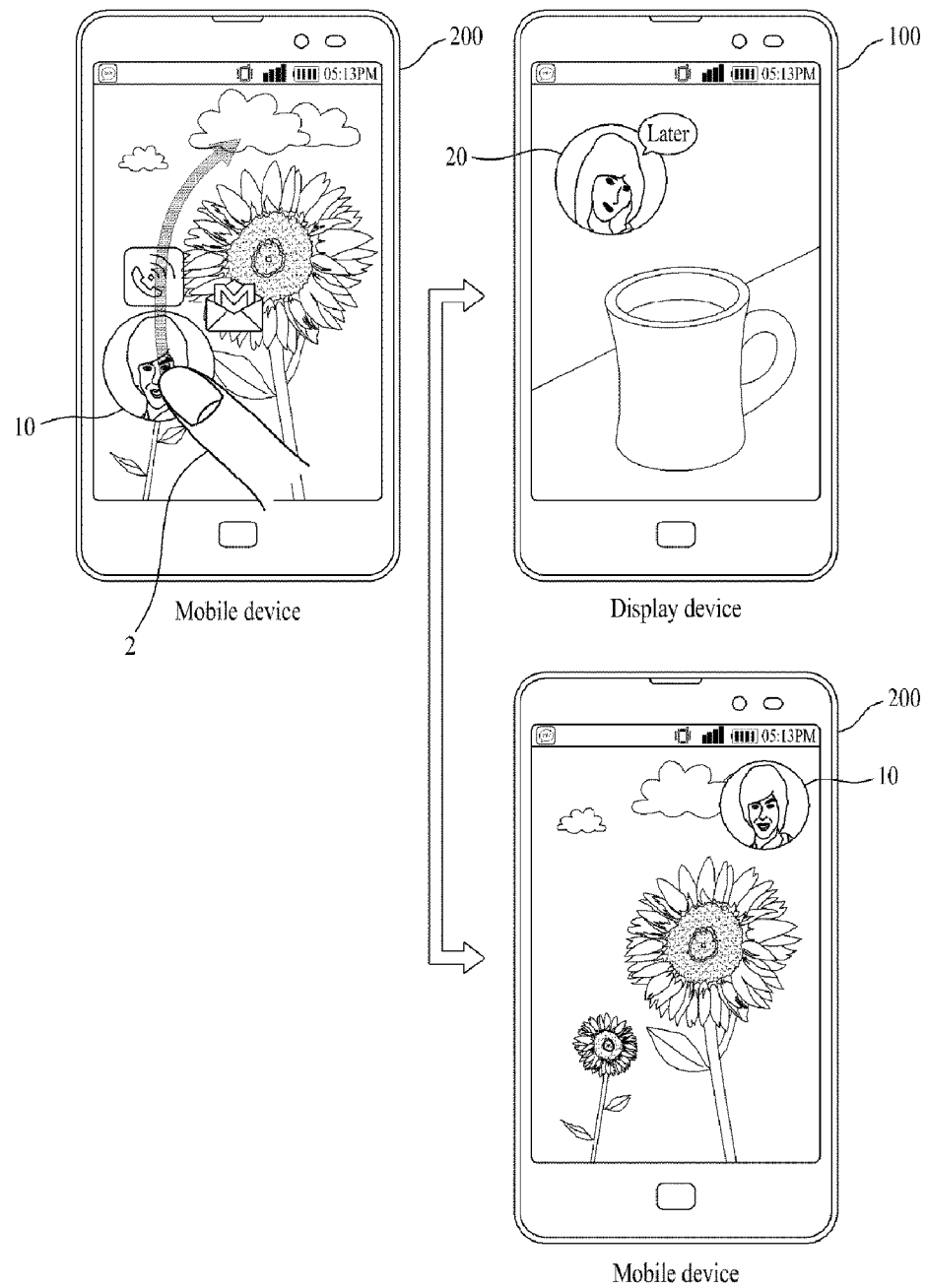

[Fig. 4c]
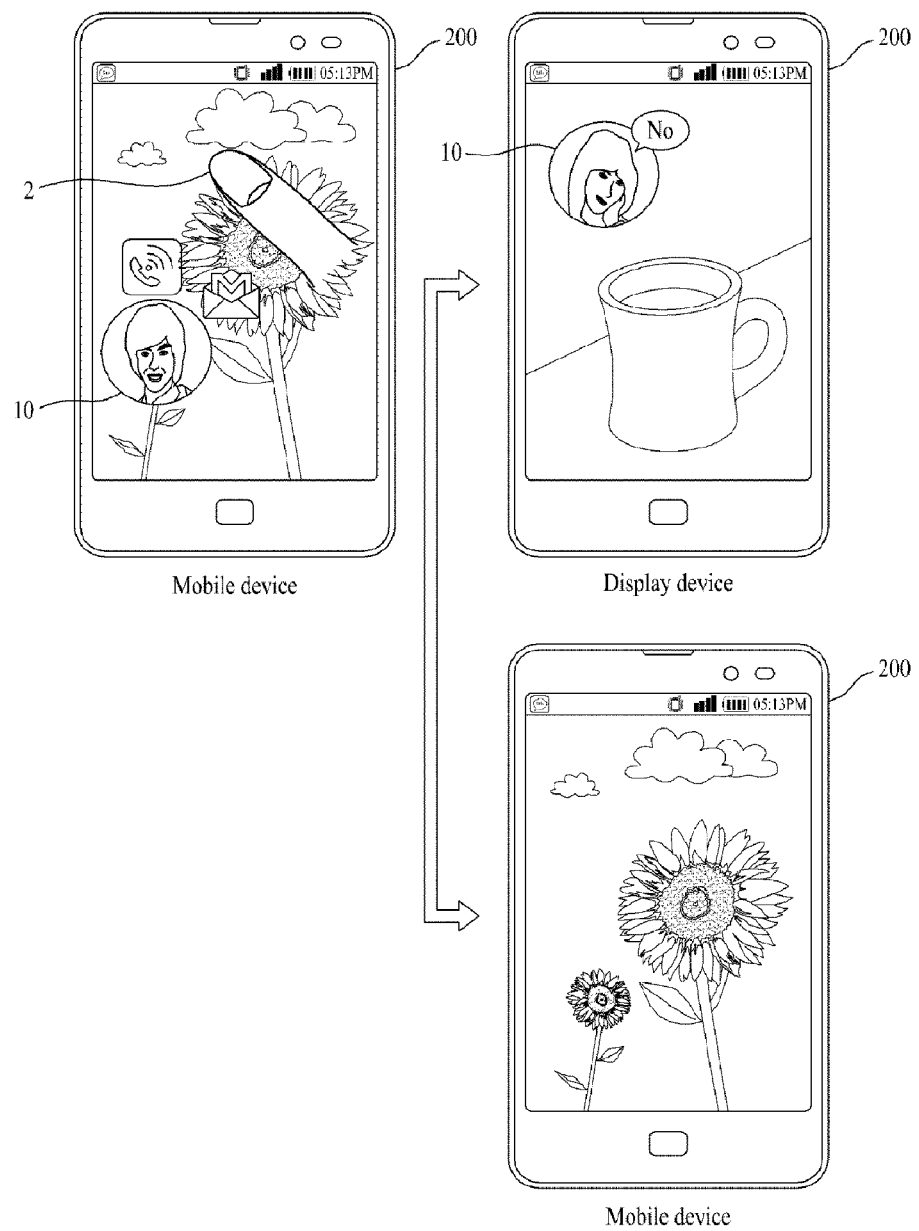

[Fig. 4d]
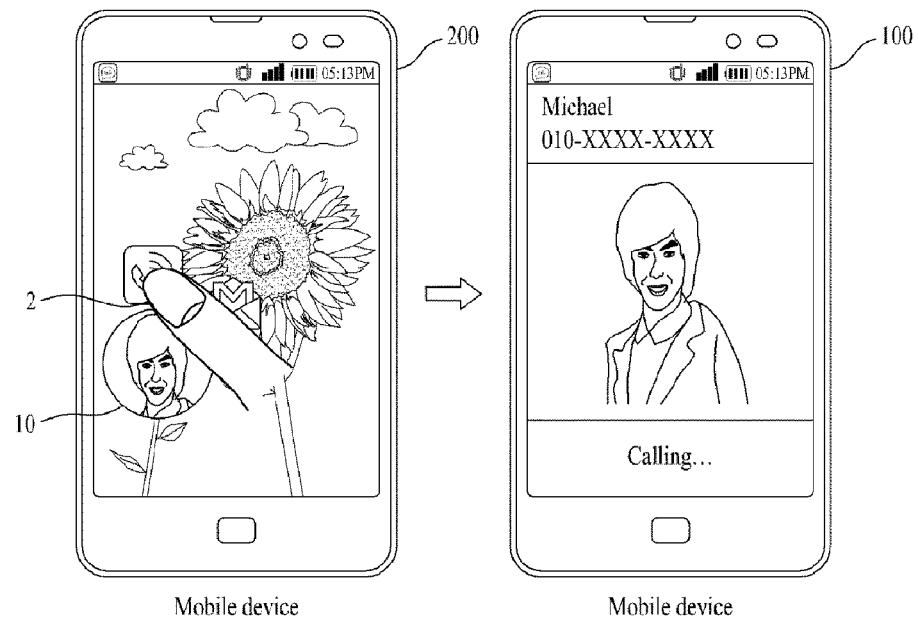
[Fig. 5a]
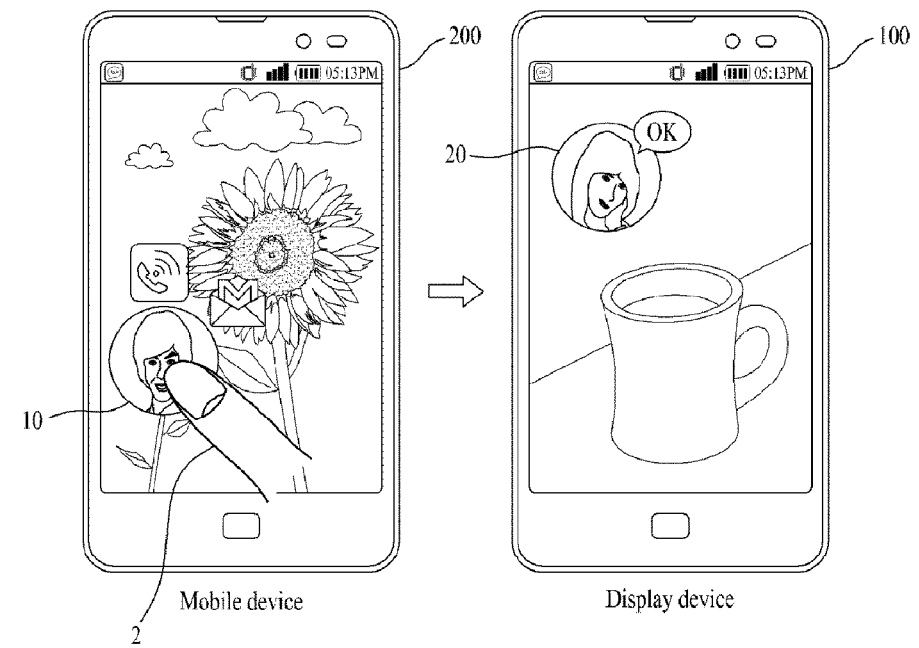

[Fig. 5b]
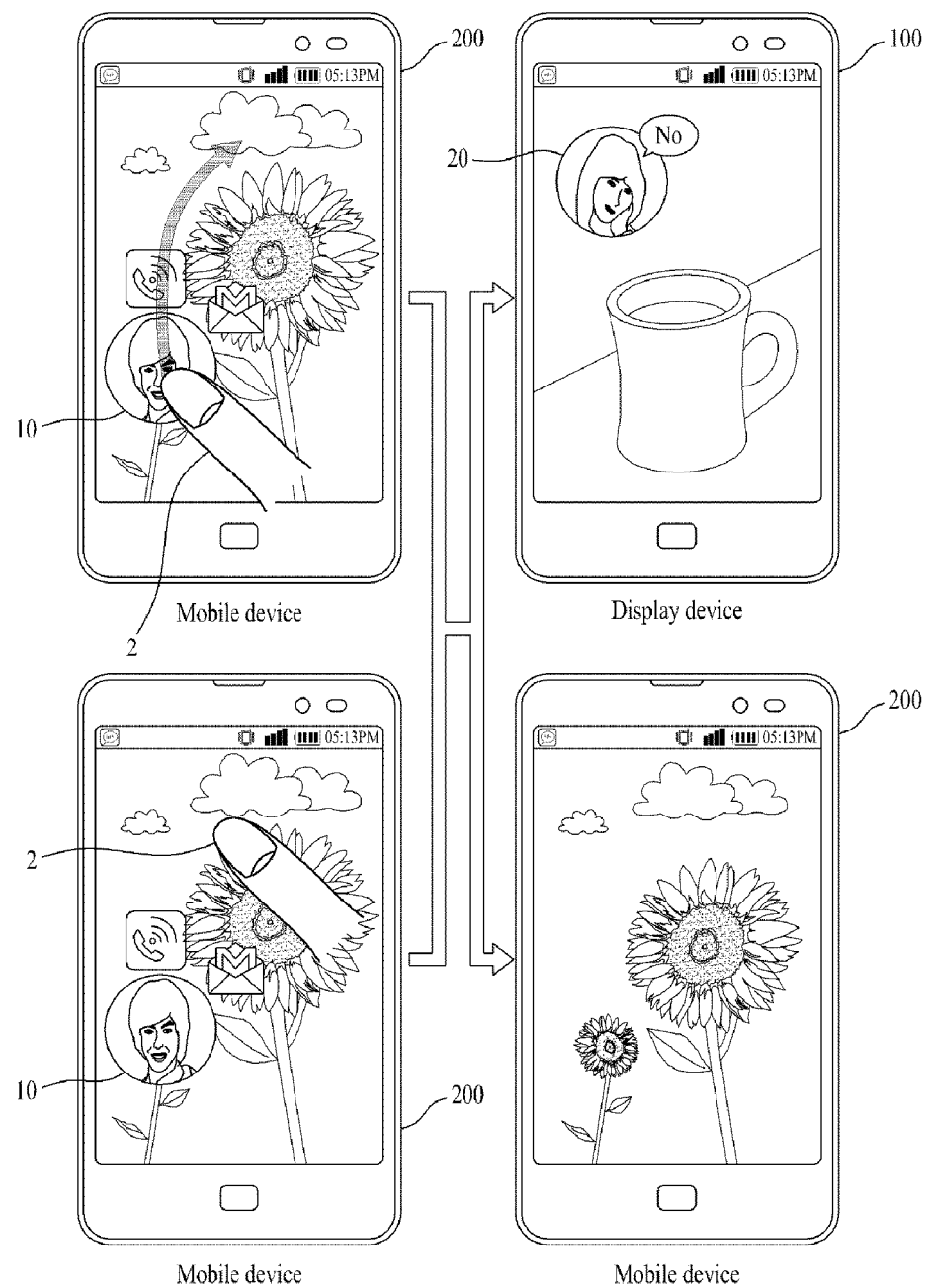

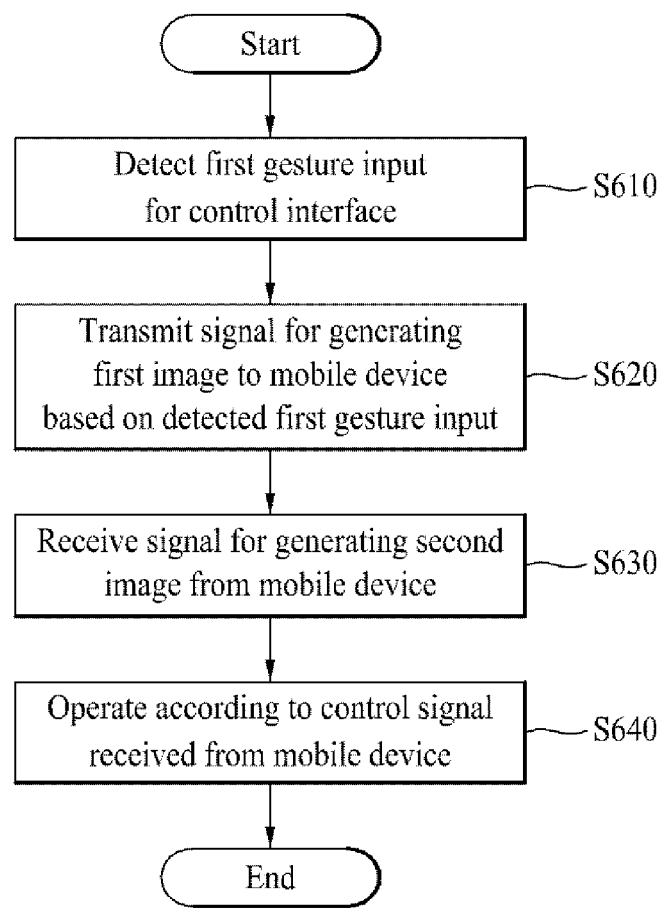
[Fig. 6]

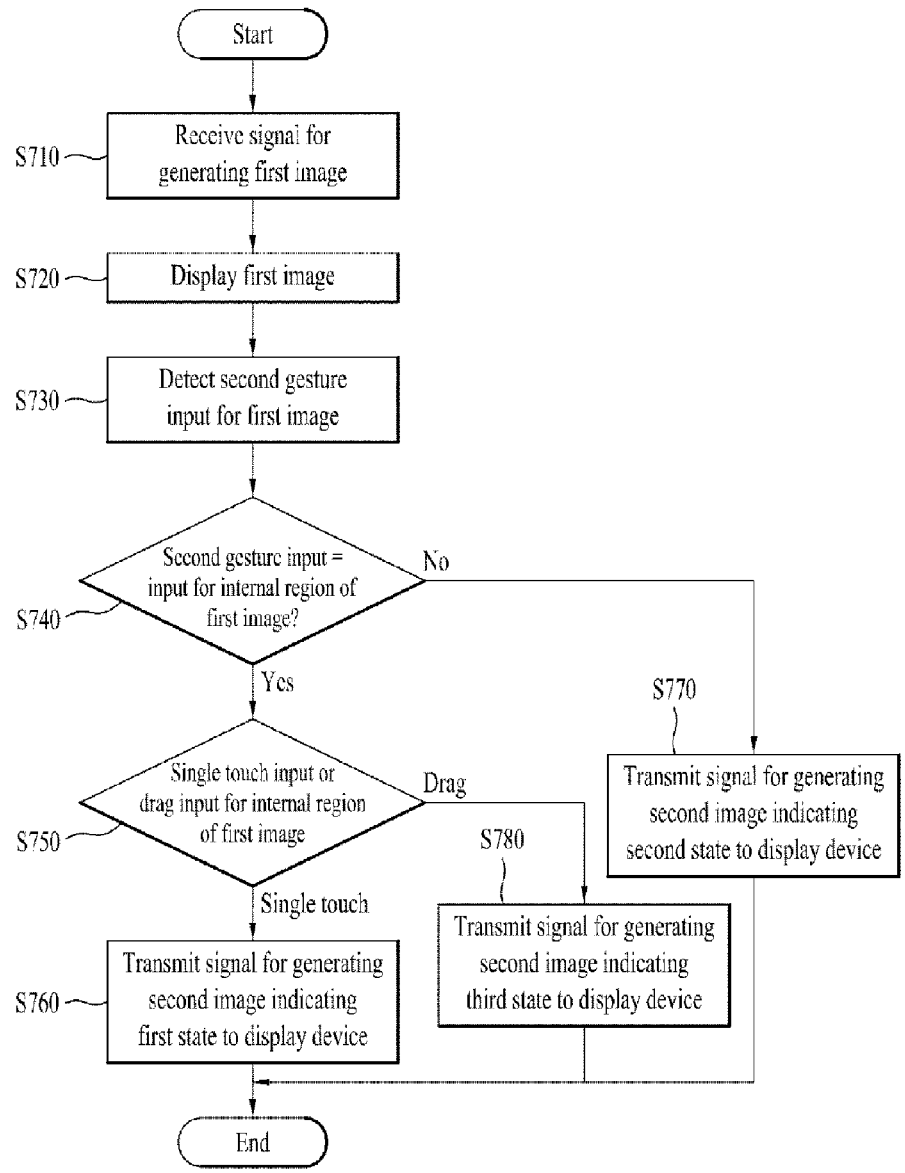
[Fig. 7]

[Fig. 8]
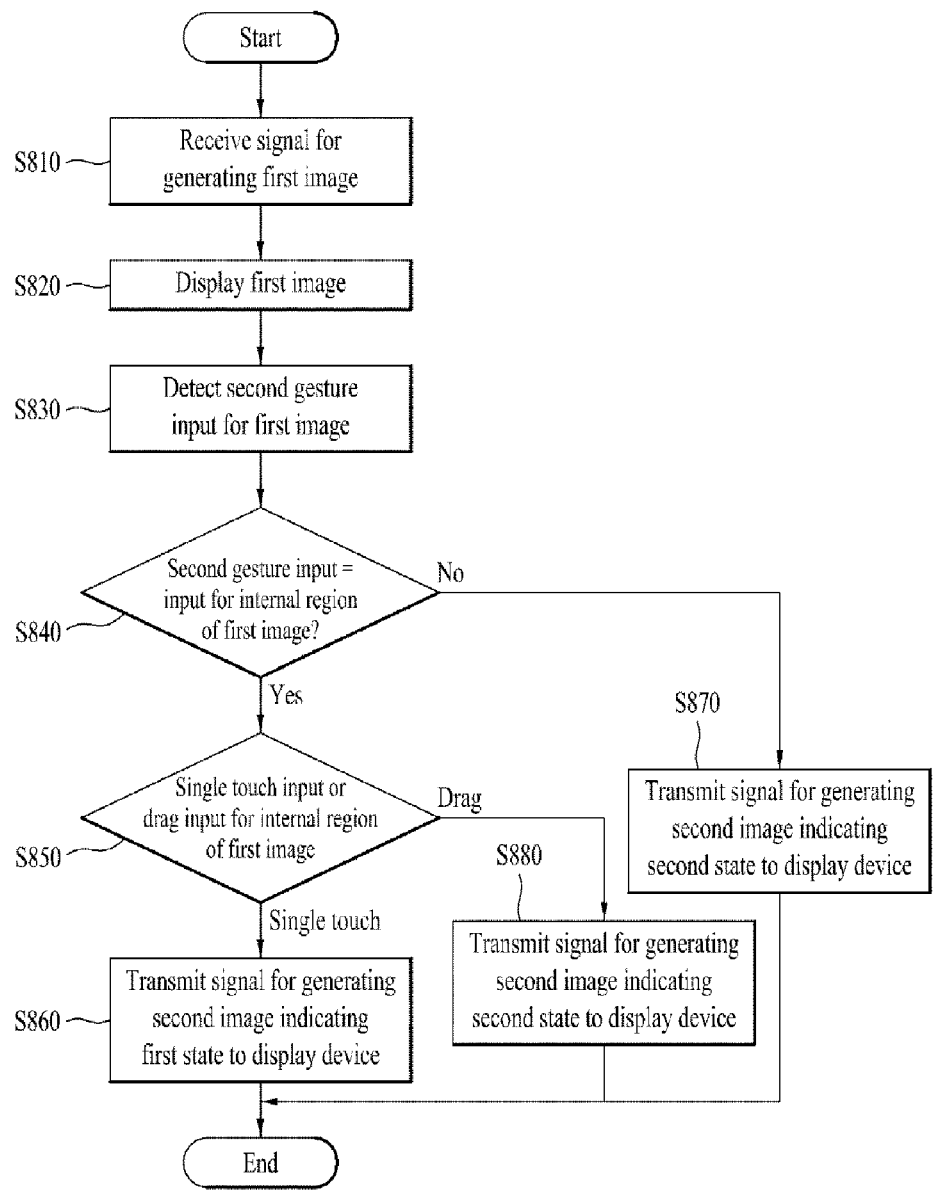

DISPLAY DEVICE AND METHOD OF CONTROLLING THE SAME

CROSS-REFERENCE TO RELATED PATENT APPLICATIONS

This application is a U.S. National Stage Application under 35 U.S.C. § 371 of PCT Application No. PCT/KR2014/000592, filed Jan. 21, 2014, which claims priority to Korean Patent Application No. 10-2013-0150390, filed Dec. 5, 2013, whose entire disclosures are hereby incorporated by reference.

TECHNICAL FIELD

The present disclosure relates to a display device and a method of controlling the same, and more particularly, to a method of enabling a first user of a display device to check a contactable state of a second user of a mobile device via gesture input.

BACKGROUND ART

A display device such as a smartphone includes a mobile phone function and a data communication function. That is, a user may install or delete various applications in a display device as desired. In addition, a user may perform communication with other people using a telephone, a message or a social network service (SNS) using a display device.

A user may easily place a phone call or send a text message to a desired counterpart using a display device. At this time, the user may wonder whether the counterpart is currently in a contactable state in addition to making a phone call or sending a text message to the counterpart. That is, there is a need for a method of immediately and easily checking a contactable state of a counterpart in addition to a phone call or a text message.

DISCLOSURE OF INVENTION

Technical Problem

An object of one embodiment devised to solve the problem lies in a method of enabling a first user of a display device to easily check a contactable state of a second user of a mobile device via gesture input.

Another object of another embodiment devised to solve the problem lies in a method of enabling a first user of a display device to easily check a contactable state of a second user via gesture input of the second user for a first image displayed on a mobile device.

Another object of another embodiment devised to solve the problem lies in a method of displaying different feedback on a display device according to position of gesture input for a first image displayed on a mobile device.

Solution to Problem

The object of the present disclosure can be achieved by providing a display device including a sensor unit configured to detect a first gesture input for a control interface, a communication unit configured to transmit a signal for generating a first image to a mobile device based on the detected first gesture input and to receive a signal for generating a second image from the mobile device, a display unit configured to display the control interface and the second image, and a processor configured to control the sensor unit, the communication unit and the display unit and execute according to a received control signal, wherein the mobile device is further configured to generate the signal for generating the first image, display the first image, detect a second gesture input for the first image, and transmit the signal for generating the second image to the display device based on the detected second gesture input, and wherein the second image indicates a first state if the second gesture input is input for an internal region of the first image and the second image indicates a second state if the second gesture input is input for an external region of the first image.

In another aspect of the present disclosure, provided herein is a method of controlling a display device including detecting a first gesture input for a control interface, transmitting a signal for generating a first image to a mobile device based on the detected first gesture input, receiving a signal for generating a second image from the mobile device, and operating according to a control signal received from the mobile device, wherein the mobile device is configured to generate the signal for generating the first image, display the first image, detect a second gesture input for the first image, and transmit the signal for generating the second image to the display device based on the detected second gesture input, and wherein the second image indicates a first state if the second gesture input is input for an internal region of the first image and the second image indicates a second state if the second gesture input is input for an external region of the first image.

Advantageous Effects of Invention

According to one embodiment, a first user of a display device can easily check a contactable state of a second user of a mobile device via simple gesture input.

According to another embodiment, a second user of a mobile device can easily inform a first user of a contactable state of the second user of the mobile device via simple gesture input for a first image displayed on the mobile device.

According to another embodiment, a display device and a mobile device can easily check a contactable state of a counterpart via a first image or a second image regardless of presence/absence of a currently used application.

BRIEF DESCRIPTION OF DRAWINGS

The accompanying drawings, which are included to provide a further understanding of the disclosure, illustrate embodiments of the disclosure and together with the description serve to explain the principle of the disclosure.

In the drawings:

FIG. 1 is a block diagram showing a display device of the present disclosure;

FIG. 2 is a diagram showing a display device and a mobile device of the present disclosure;

FIG. 3 is a diagram showing a first embodiment of a method of controlling a display device of the present disclosure;

FIGS. 4*a* to 4*d* are diagrams showing a second embodiment of a method of controlling a display device of the present disclosure;

FIGS. 5*a* to 5*b* are diagrams showing a third embodiment of a method of controlling a display device of the present disclosure;

FIG. 6 is a flowchart illustrating a method of controlling a display device of the present disclosure;

FIG. 7 is a flowchart illustrating a method of controlling a display device of the present disclosure; and FIG. 8 is a flowchart illustrating a method of controlling a display device of the present disclosure.

BEST MODE FOR CARRYING OUT THE INVENTION

Although the terms used in the present disclosure are selected from generally known and used terms, terms used herein may be variable depending on operator's intention or customs in the art, appearance of a new technology, or the like. In addition, some of the terms mentioned in the description of the present disclosure have been selected by the applicant at his or her discretion, the detailed meanings of which are described in relevant parts of the description herein. Furthermore, the present disclosure must be understood, not simply by the actual terms used but by the meanings of each term lying within.

Although embodiments are described in detail with reference to the accompanying drawings, the present disclosure is not limited by the embodiments.

FIG. 1 is a block diagram showing a display device of the present disclosure. FIG. 1 shows one embodiment, from which some components may be deleted or to which new components may be added as necessary.

As shown in FIG. 1, the display device 100 according to one embodiment may include a display unit 110, a sensor unit 120, a communication unit 130 and a processor 140.

First, the display device 100 described in the present disclosure may include various display devices which may display an image, such as a personal computer (PC), a personal digital assistant (PDA), a laptop, a tablet PC or a smartphone. In particular, the display device 100 may include various devices including a touchscreen.

The display unit 110 may display visual information. The visual information may include content, an application, an image, a moving image, etc. In addition, the display unit 100 may output the visual information on a screen based on a control command of the processor 140.

In the present disclosure, the display unit 110 may correspond to a touchscreen. The touchscreen may detect the position of a person's hand or an object which touches characters displayed on a screen or a specific part of the screen without using a separate keyboard and directly receive input data on the screen. Accordingly, in the present disclosure, the display unit 110 may include a sensor unit 120. In the present disclosure, the display unit 110 may display a control interface and a second image. The control interface may correspond to various interfaces which may be used by a user on the display device 100. For example, the control interface may include an address book, a telephone, settings, a calendar, etc. In addition, the second image will be described with reference to FIGS. 4 and 5.

The sensor unit 120 may sense a surrounding environment of the display device 100 using at least one sensor mounted in the display device 100 and send the sensed result to the processor 140 in the form of a signal.

The sensor unit 120 may include at least one sensor. In one embodiment, at least one sensor may include a gravity sensor, a geomagnetic sensor, a motion sensor, a gyroscopic sensor, an acceleration sensor, an infrared sensor, an inclination sensor, a brightness sensor, an altitude sensor, an olfactory sensor, a temperature sensor, a depth sensor, a pressure sensor, a bending sensor, an audio sensor, a video sensor, a global positioning system (GPS) sensor, a touch sensor, a grip sensor, etc.

In addition, the sensor unit 120 includes the above-described sensors, senses the environment of the display device 100 and a variety of user input, and sends the sensed result to the processor 140 such that the processor 140 operates according to the sensed result.

In the present disclosure, the sensor unit 120 may sense first gesture input for a control interface. In addition, as described above, the sensor unit 120 may be included in the display unit 110 to sense the first gesture input. Here, the first gesture input may include input by a user's hand or input by an object (e.g., a pen). For example, the first gesture input may include single touch input, multitouch input, drag (slide) input, long touch input, hovering input, pinch-to-zoom in input, pinch-to-zoom out input, etc.

Single touch input may indicate that a user touches the display device 100 once. Multitouch input may indicate that a user touches the display device 100 two times or more. Drag (slide) input may indicate that a user touches the display device 110 once and moves by a predetermined length or more. Hovering input is not direct touch input to the display device 110 but is proximity touch input to the display unit 110 at a predetermined distance from the display unit 110. In addition, pinch-to-zoom in input indicates zooming in on content via pinch input, that is, by moving two fingers away from each other on the display unit 110. In addition, pinch-to-zoom out input indicates zooming out content via pinch input, that is, by approaching two fingers on the display unit 110.

The communication unit 130 may perform communication with an external device using various protocols and transmit and receive data. In addition, the communication unit 130 may access a network by wire or wirelessly to transmit and receive digital data such as content. The communication unit may use Wireless Local Area Network (WLAN) (i.e., Wi-Fi), Wireless Broadband (WiBro), World Interoperability for Microwave Access (WiMax), and High Speed Downlink Packet Access (HSDPA), for connection to wireless networks.

In the present disclosure, the communication unit 130 may perform communication with a mobile device 200 using various protocols and transmit and receive data. For example, the communication unit 130 may transmit a signal for generating a first image to the mobile device 200 based on detected first gesture input. In addition, the communication unit 130 may receive a signal for generating a second image from the mobile device 200.

The mobile device 200 is different from the display device 100 and may include a display unit, a sensor unit, a communication unit and a processor, similarly to the display device 100. The mobile device 200 will be described with reference to FIG. 2.

The processor 140 may process data, control the units of the display device 100 and control data transmission/reception between the units. In addition, in the present disclosure, the processor 140 may operate according to a control signal received from the mobile device 200.

In one embodiment of the present disclosure, operations performed by the display device 100 may be controlled by the processor 140. For convenience, in the drawings and the following description, assume that such operations are performed/controlled by the display device 100.

Although not shown in FIG. 1, the display device 100 may include a power unit, a storage unit, an audio unit, etc. The power unit is a power source connected to a battery of the display device 100 or an external power supply to supply power to the display device 100. In addition, the storage unit may store a variety of digital data such as audio, pictures, moving images or applications. The storage unit may indicate a variety of digital data storage spaces such as a flash memory, a random access memory (RAM) or a solid state drive (SSD). The storage unit may be located inside or outside the display device 100. In addition unit may receive or output audio data via a microphone and a speaker.

The display device 100 shown in FIG. 1 is exemplary and blocks shown in FIG. 1 correspond to logically divided elements of the display device 100. Accordingly, the elements of the display device 100 may be mounted in one chip or a plurality of chips according to device design.

FIG. 2 is a diagram showing a display device and a mobile device of the present disclosure. FIG. 2 shows interaction between the display device 100 and the mobile device 200 in the present disclosure.

First, the display device 100 and the mobile device 200 described in the present disclosure include respective touchscreens and the types thereof may be the same or different. That is, the mobile device 200 may include a display unit, a sensor unit, a communication unit, a processor, etc. similarly to the display device 100. The display device 100 and the mobile device 200 may transmit and receive data to and from each other via the respective communication units included in the devices.

A first user 1 may be an owner or user of the display device 100. A second user 2 may be an owner or user of the mobile device 200.

In daily life, the first user 1 and the second user 2 may frequently perform communication. In this case, the first user 1 and the second user 2 may make contact with each other via a text message, a phone, etc. The first user 1 or the second user 2 may wonder whether a counterpart is in a contactable state before making contact with each other. In this case, it may be necessary to perform a method of checking whether a counterpart is in a contactable state before sending a text message or placing a phone call.

Hereinafter, in FIGS. 3 to 5, a method of enabling the first user 1 and the second user 2 to easily check whether the respective counterparts are in a contactable state using the display device 100 and the mobile device 200 is illustrated.

FIG. 3 is a diagram showing a first embodiment of a method of controlling a display device of the present disclosure. FIG. 3(a) shows the case in which the mobile device 200 displays a first image 10 when the display device 100 detects first gesture input and FIG. 3(b) shows the first gesture input for the display device 100.

First, the display device 100 may detect the first gesture input for the control interface. The control interface is a user interface displayed on the display unit, which enables a user to acquire information from the device or to provide information to the device. The control interface may correspond to an application such as a phone, an address book, the Internet, settings, etc. For example, the control interface shown in FIG. 3(a) may correspond to an address book.

The display device 100 may detect first gesture input for specific information of a variety of information displayed on the control interface. For example, in FIG. 3(a), the display device 100 may detect first gesture input for the second user "Emily" among a plurality of displayed persons.

As described above with reference to FIG. 1, the first gesture input may be variously performed by the user. The first gesture input may correspond to gesture input for enabling the first user to check whether the second user is in a contactable state. For example, the first gesture input may include single touch input, multitouch input, drag (slide) input, long touch input, hovering input, pinch-to-zoom in input, pinch-to-zoom out input, etc. In the present disclosure, the first gesture input may correspond to multitouch input as shown in FIG. 3(b). For example, single touch input for the image of the second user may correspond to confirming information about the second user or placing a phone call to the second user. Unlike single touch input, multitouch input enables the first user 1 to feel as if the first user 1 knocks on the second user "Emily".

Next, the display device 100 may transmit a signal for generating the first image 10 to the mobile device 200 based on the detected first gesture input. In addition, the mobile device 200 may receive the signal for generating the first image 10 from the display device 100 and display the first image 10 on the display unit. More particularly, the mobile device 200 may display the first image 100 in the form of a popup window regardless of a currently used application. The popup window may correspond to a new window which is suddenly generated in order to display specific content. Accordingly, the second user may confirm the first image 10 while performing another operation via the mobile device 200.

Herein, the first image 10 may correspond to an image including information about the first user 1 of the display device 100. As shown in the right of FIG. 3(a), the first image 10 may include an image indicating the first user 1, a phone image, a message image, etc. In addition, for example, the first image 10 may include a brief message to be sent from the first user 1 to the second user 2. The first image 10 may be various images related to the first user 1. The mobile device 200 may display the first image 10 to indicate that the first user 1 of the display device 100 asks whether the second user 2 is in a contactable state. In addition, the second user 2 of the mobile device 200 may easily recognize that the first user 1 asks whether the second user 2 is in a contactable state via the first image 1.

Hereinafter, FIGS. 4 and 5 show a variety of feedback displayed on the mobile device 200 and the display device 100 according to the position and method of second gesture input for the mobile device 200.

FIGS. 4a to 4d are diagrams showing a second embodiment of a method of controlling a display device of the present disclosure. More particularly, FIGS. 4a and 4b show the case in which second gesture input for an internal region of the first image 10 is detected, FIG. 4c shows the case in which second gesture input for an external region of the first image 10 is detected, and FIG. 4d shows the case in which second gesture input for a phone image of the first image 10 is detected.

The mobile device 200 may detect the second gesture input for the internal region or external region of the first image 10. The internal region of the first image 10 may correspond to an image indicating the first user 1, a phone image and a message image in FIG. 4a. The internal region of the first image 10 may include a nearby region in addition to the region including the image indicating the first user 1, the phone image and the message image. The external region of the first image 10 may correspond to a region excluding the internal region of the first image 10 in FIG. 4a.

In addition, the second gesture input may be performed by the second user 2 of the mobile device 200 using various methods. In addition, the second gesture input may correspond to a response of the second user to the first user. For example, the second gesture input may include single touch input, multitouch input, drag (slide) input, long touch input, hovering input, pinch-to-zoom in input, pinch-to-zoom out input, etc.

In one embodiment, referring to FIG. 4a, the mobile device 100 may detect single touch input for the internal region of the first image 10. Here, single touch input for the internal region of the first image 10 may indicate that the second user 2 is currently in a first state. The first state corresponds to a contactable state. In this case, the mobile device 200 may transmit a signal for generating the second image indicating the first state to the display device 100. Referring to the right of FIG. 4a, the display device 100 may receive the signal for generating the second image 20 from the mobile device 200 and display the second image 20. More particularly, the display device 100 may display the second image in the form of a popup window regardless of presence/absence of a currently used application. Accordingly, the first user may always easily recognize whether the second user is in a contactable state even when another application is being used.

At this time, the display device 100 may display the second image 20 and an "OK" message informing the first user of a contactable state. In addition, the display device 100 may display a message other than the "OK" message to inform the first user that the second user 2 is in a contactable state. Accordingly, the first user may recognize that the second user is currently in a contactable state and place a phone call or send a message to the second user. That is, if third gesture input for the second image 20 indicating the first state is detected, the display device 100 may place a phone call or send a message to the mobile device 200. Here, the third gesture input may include single touch, multitouch, long touch, etc.

In this case, although not shown in FIG. 4a, the mobile device 200 may transmit the signal for generating the second image 20 to the display device 100 and delete the first image 10 displayed on the mobile device 200. This is because the first user has already been informed that the second user is in the contactable state via the second gesture input and thus the first image 100 does not need to be displayed.

In another embodiment, referring to FIG. 4b, the mobile device 100 may detect drag (slide) input for the internal region of the first image 10. Here, drag (slide) input for the internal region of the first image 10 may indicate that the second user 2 is currently in a third state. The third state corresponds to a call reserve state. That is, since the second user 2 is currently busy, the fact that the second user 2 requests the first user 1 to call back later or that the second user 2 will call back later may be expressed via drag (slide) input for the internal region of the first image 10.

In this case, the mobile device 200 may transmit the signal for generating the second image 20 indicating the third state to the display device 100. Accordingly, referring to the right upper side of FIG. 4b, the display device 100 may receive the signal for generating the second image 20 and display the second image 20. At this time, the display device 100 may display the second image 20 and may display a message "Later" in order to indicate the call reserve state. Another message indicating the call reserve state may be displayed. Accordingly, the first user may recognize that the second user is in a non-contactable state and attempt to make contact with the second user.

Meanwhile, as shown in the right of FIG. 4b, in this case, the mobile device 200 may transmit the signal for generating the second image indicating the third state to the display device 100 and display the first image 10, the position of which has been changed, via drag (slide) input. Since the first image 10 is continuously displayed, the second user 2 may recognize that the second user will make contact with the first user 1 later.

Also, in another embodiment, referring to FIG. 4c, the mobile device 200 may detect input for the external region of the first image 10. For example, input for the external region of the first image 10 may include various input methods such as single touch input, multitouch input or hovering touch input. Here, input for the external region of the first image 10 may indicate that the second user 2 is in a second state. The second state corresponds to a non-contactable state. That is, the second user 2 may express a non-contactable state via input for the external region of the first image 10.

In this case, the mobile device 200 may transmit the signal for generating the second image indicating the second state to the display device 100. Accordingly, referring to the right upper side of FIG. 4c, the display device 100 may receive the signal for generating the second image 20 and display the second image 20. At this time, the display device 100 may display the second image 20 and display a message "No" in order to indicate a non-contactable state. In addition, the display device 100 may display another message other than "No" to indicate a non-contactable state. Accordingly, the first user may recognize that the second user is currently in a non-contactable state.

In this case, the mobile device 200 may transmit the signal for generating the second image 20 indicating the second state and delete the first image 10 from the display unit. Unlike FIG. 4b, since the first user is informed that the second user 2 is in a non-contactable state, the first image 10 does not need to be displayed.

Also, in another embodiment, referring to FIG. 4d, the mobile device 100 may detect input for a phone image in the internal region of the first image 10. Here, input for the phone image in the internal region of the first image may express the fact that the second user 2 will place a phone call to the first user. In this case, the mobile device 200 may place a phone call to the display device 100. Accordingly, referring to the right of FIG. 4d, the display device 100 may receive the call from the second user 2.

Although not shown in FIG. 4d, the mobile device 200 may detect input for the message image in the internal region of the first image 10. Here, input for the message image in the internal region of the first image may express the fact that the second user 2 will send a text message to the first user. In this case, the mobile device 200 may execute a text message application and send the text message to the display device 100.

Although not shown in FIG. 4, the mobile device 200 may detect pinch-to-zoom in input for the image of the first user 1 in the internal region of the first image 10. Pinch-to-zoom in input may correspond to input for zooming in a displayed image via pinch gesture input. Here, pinch-to-zoom in input for the image of the first user 1 in the internal region of the first image 10 may express an opinion that the second user 2 will place a phone call to the first user 1. In this case, as shown in the right of FIG. 4d, the mobile device 200 may place a phone call to the display device 100.

Although not shown in FIG. 4, the mobile device 200 may detect pinch-to-zoom out input for the image of the first user 1 in the internal region of the first image 10. Pinch-to-zoom out input may correspond to input for zooming out a displayed image via pinch gesture input. Here, pinch-to-zoom out input for the image of the first user 1 in the internal region of the first image 10 may express an opinion that the second user 2 rejects the call of the first user 1. In this case, as shown in the right lower side of FIG. 4c, the first image 10 may be deleted. In addition, as described with reference to FIG. 4c, the mobile device 200 may transmit the signal for generating the second image 20 indicating the second state to the display device 100

With regard to the embodiments of the second gesture input of FIG. 4, the result of the second gesture input is not limited to the above-described embodiments. That is, the result of the second gesture input may be variously implemented.

FIGS. 5a to 5b are diagrams showing a third embodiment of a method of controlling a display device of the present disclosure. More particularly, FIG. 5a shows the case in which single touch input for the internal region of the first image 10 is detected and FIG. 5b shows the case in which drag input for the internal region of the first image 10 and input for the external region of the first image 10 are detected.

In one embodiment, referring to FIG. 5a, the mobile device 200 may detect single touch input for the internal region of the first image 10. In this case, as described with reference to FIG. 4a, single touch input for the internal region of the first image 10 may indicate that the second user 2 is currently in the first state. Accordingly, the mobile device 200 may transmit the signal for generating the second image indicating the first state to the display device 100. As shown in the right of FIG. 5a, the display device 100 may display the second image 20 and display an "OK" message in order to indicate a contactable state.

In another embodiment, referring to FIG. 5b, the mobile device 200 may detect drag (slide) input for the internal region of the first image 10. In addition, the mobile device 200 may detect input for the external region of the first image 10. Here, drag (slide) input for the internal region of the first image 10 and input for the external region of the first image 10 may indicate that the second user 2 is currently in the second state. The second state corresponds to a non-contactable state. This embodiment is different from the embodiment of FIG. 4 in that drag (slide) input for the internal region of the first image 10 also corresponds to the second state.

In this case, the mobile device 200 may transmit the signal for generating the second image 20 indicating the second state to the display device 100. Accordingly, referring to the right upper side of FIG. 5b, the display device 100 may receive the signal for generating the second image 20 and display the second image 20. At this time, the display device 100 may display the second image 20 and display a "No" message in order to indicate a non-contactable state. As shown in the right lower side of FIG. 5b, the mobile device 200 may transmit the signal for generating the second image 20 to the display device 100 and delete the first image 10 from the display unit.

The present disclosure is not limited to the embodiments of FIGS. 4 and 5. Accordingly, the first to third states are not limited to the contactable state, the call reserve state and the non-contactable state described with reference to FIG. 4 and may be variously implemented. The first image 10 displayed on the mobile device 200 and the second image 20 displayed on the display device 100 may be implemented via various graphic effects.

FIG. 6 is a flowchart illustrating a method of controlling a display device of the present disclosure.

First, the display device may detect the first gesture input for the control interface (S610). As described with reference to FIG. 2, the first gesture input may correspond to multi-touch input. In addition, the first gesture input may correspond to gesture input for enabling the first user of the display device to check whether the second user is in a contactable state.

Next, the display device may transmit the signal for generating the first image to the mobile device based on the detected first gesture input (S620). As described with reference to FIG. 2, the first image may include at least one of the image indicating the first user, the telephone image and the message image.

Next, the display device may receive the signal for generating the second image from the mobile device (S630). The second image may include the image indicating the second user. In addition, the second image may include the message indicating the state of the second user.

Next, the display device may operate according to the control signal received from the mobile device (S640). For example, if the second image indicating the first state is received, the display device may display the second image and indicate that the second user is in the contactable state. In addition, if the second image indicating the second state is received, the display device may display the second image and indicate that the second user is in the call reserve state. In addition, if the third image indicating the third state is received, the display device may display the second image and indicate that the second user is in the non-contactable state.

FIG. 7 is a flowchart illustrating a method of controlling a display device of the present disclosure. More particularly, FIG. 7 shows a method of controlling the mobile device which transmits and receives data to and from the display device.

The mobile device may receive the signal for generating the first image (S710). Next, the mobile device may display the first image (S720). Here, the display position of the first image on the display unit may be displayed according to settings of the second user or randomly.

Next, the mobile device may detect the second gesture input for the first image (S730). As described with reference to FIG. 4, the second gesture input may include single touch input, multitouch input, hovering touch input, drag touch input, etc.

Next, the mobile device may determine whether the second gesture input is input for the internal region of the first image (S740). As described with reference to FIG. 4, the internal region of the first image is not limited to the inside of the first image and may include a nearby region of the first image.

In step S740, if the second gesture input is input for the internal region of the first image, the mobile device may determine whether the second gesture input is single touch input or drag input for the internal region of the first image (S750). In step S750, if the second gesture input is single touch input for the internal region of the first image, the mobile device may transmit the signal for generating the second image indicating the first state to the display device (S760). Here, the first state may correspond to the contactable state.

In step S740, if the second gesture input is not input for the internal region of the first image, the mobile device may transmit the signal for generating the second image indicating the second state to the display device (S770). The second gesture input which is not input for the internal region of the first image may correspond to input for the external region of the first image. The second state may correspond to the non-contactable state.

In step S750, if the second gesture input is drag input for the internal region of the first image, the mobile device may transmit the signal for generating the second image indicating the third state to the display device (S780). Here, the third state may correspond to the call reserve state.

FIG. 8 is a flowchart illustrating a method of controlling a display device of the present disclosure. More specifically, FIG. 8 shows a method of controlling the mobile device which transmits and receives data to and from the display device. In FIG. 8, the same steps as FIG. 7 will be omitted.

The mobile device may receive the signal for generating the first image (S810). Next, the mobile device may display the first image (S820). Next, the mobile device may detect the second gesture input for the first image (S830). Next, the mobile device may determine whether the second gesture input is input for the internal region of the first image (S840).

In step S840, if the second gesture input is input for the internal region of the first image, the mobile device may determine whether the second gesture input is single touch input or drag input for the internal region of the first image (S850).

In step S850, if the second gesture input is single touch input for the internal region of the first image, the mobile device may transmit the signal for generating the second image indicating the first state to the display device (S860).

In step S840, if the second gesture input is not input for the internal region of the first image, the mobile device may transmit the signal for generating the second image indicating the second state to the display device (S870). In step S850, if the second gesture input is drag input for the internal region of the first image, the mobile device may transmit the signal for generating the second image indicating the second state to the display device (S880). That is, as described with reference to FIG. 5, both drag input for the internal region of the first image and input for the external region of the first image may indicate the non-contactable state.

Further, although the embodiments are respectively described with reference to the respective drawings for convenience of description, the embodiments may be combined to implement a new embodiment. A computer readable recording medium having a program recorded therein for implementing the above-described embodiments is also within the spirit of the present disclosure.

The display device and the method of controlling the same according to one embodiment are not limited to the configurations and methods of the above-described embodiments and all or some of the embodiments may be combined and modified.

The display device and the method of controlling the same according to the foregoing embodiments may be implemented as code that can be written to a computer-readable recording medium and can thus be read by a processor. The computer-readable recording medium may be any type of recording device in which data can be stored in a computer-readable manner. Examples of the computer-readable recording medium include a ROM, a RAM, a CD-ROM, a magnetic tape, a floppy disk, optical data storage, and a carrier wave (e.g., data transmission over the Internet). The computer-readable recording medium can be distributed over a plurality of computer systems connected to a network so that computer-readable code is written thereto and executed therefrom in a decentralized manner. Functional programs, code, and code segments needed to realize the embodiments herein can be construed by one of ordinary skill in the art.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

Both apparatus and method inventions are mentioned in this disclosure and descriptions of both the apparatus invention and method inventions may be complementarily applied to each other.

MODE FOR THE INVENTION

Various embodiments have been described in the best mode for carrying out the invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

As described above, the present invention is totally or partially applicable to electronic devices.

The invention claimed is:

1. A display device comprising:
a sensor unit configured to detect first gesture input for a control interface;
a communication unit configured to transmit a signal for generating a first image to a mobile device based on the detected first gesture input and receive a signal for generating a second image from the mobile device;
a display unit configured to display the control interface and the second image; and
a processor configured to control the sensor unit, the communication unit and the display unit and execute according to a received control signal,
wherein the mobile device is configured to generate the signal for generating the first image, display the first image, detect second gesture input for the first image, and transmit the signal for generating the second image to the display device based on the detected second gesture input, and
wherein the second image indicates a first state if the second gesture input is a input for an internal region of the first image and the second image indicates a second state if the second gesture input is a input for an external region of the first image.

2. The display device according to claim 1, wherein the first state indicates a contactable state and the second state indicates a non-contactable state.

3. The display device according to claim 2, wherein, if the second gesture input is single touch input for the internal region of the first image, the second image indicates the first state.

4. The display device according to claim 3, wherein the mobile device is further configured to delete the displayed first image based on the detected second gesture input.

5. The display device according to claim 2, wherein, if the second gesture input is drag input for the internal region of the first image, the second image indicates a third state, wherein the third state indicates a call reserve state.

6. The display device according to claim 5, wherein the mobile device is further configured to change the position of the first image based on the detected second gesture input.

7. The display device according to claim 2, wherein, if the second gesture input is drag input for the internal region of the first image, the second image indicates the second state.

8. The display device according to claim 7, wherein the mobile device is further configured to delete the displayed first image based on the detected second gesture input.

9. The display device according to claim 2, wherein the mobile device is further configured to place a phone call to the display device if the second gesture input is pinch-to-zoom in input for the first image.

10. The display device according to claim 2, wherein, if the second gesture input is pinch-to-zoom out input for the first image, the second image indicates the second state.

11. The display device according to claim 1, wherein the first image includes information about a first user of the display device, wherein the first image includes at least one of an image indicating the first user, a phone image and a message image.

12. The display device according to claim 11, wherein a input for the internal region of the first image is a input for the image indicating the first user.

13. The display device according to claim 11, wherein the mobile device is further configured to place a phone call to the first user of the display device based on the second gesture input, if the first image is the phone image.

14. The display device according to claim 11, wherein the mobile device is further configured to send a message to the first user of the display device based on the second gesture input, if the first image is the message image.

15. The display device according to claim 1, wherein the control interface displays information about a second user.

16. The display device according to claim 1, wherein at least one of the first image and the second image corresponds to a popup window.

17. The display device according to claim 1, wherein the second image indicates an image indicating the second user and a contactable state of the second user.

18. The display device according to claim 1, wherein the processor is further configured to place a phone call or send a message to the mobile device if a third gesture input for the second image indicating the first state is detected.

19. The display device according to claim 18, wherein at least one of the first gesture input, the second gesture input and the third gesture input include at least one of single touch input, multitouch input, long touch input, hovering touch input, drag touch input, pinch-to-zoomin input and pinch-to-zoomout input.

20. A method of controlling a display device, the method comprising:
   detecting first gesture input for a control interface;
   transmitting a signal for generating a first image to a mobile device based on the detected first gesture input;
   receiving a signal for generating a second image from the mobile device; and
   operating according to a control signal received from the mobile device,
   wherein the mobile is configured to generate the signal for generating the first image, display the first image, detect second gesture input for the first image, and transmit the signal for generating the second image to the display device based on the detected second gesture input, and
   wherein the second image indicates a first state if the second gesture input is a input for an internal region of the first image and the second image indicates a second state if the second gesture input is a input for an external region of the first image.

\* \* \* \* \*